United States Patent [19]
Hyde et al.

[11] 4,154,565
[45] May 15, 1979

[54] CORRUGATOR ROLL

[75] Inventors: Glenn F. Hyde, Timonium; Harvey A. Kasinoff, Reisterstown; Gordon L. Morgret, Baltimore; Richard R. Pfunder, Cockeysville; Charles E. Thomas, Reisterstown, all of Md.

[73] Assignee: Koppers Company, Inc., Pittsburgh, Pa.

[21] Appl. No.: 903,108

[22] Filed: May 5, 1978

[51] Int. Cl.$^2$ .............................................. A01J 21/00
[52] U.S. Cl. ........................................ 425/369; 148/4; 156/461; 425/336
[58] Field of Search ............... 425/369, 335, 336, 363, 425/396; 156/461; 74/457; 148/4

[56] References Cited

U.S. PATENT DOCUMENTS

| | | | |
|---|---|---|---|
| 3,256,566 | 6/1966 | Campbell | 425/336 |
| 3,390,040 | 6/1968 | Moser et al. | 156/473 |
| 3,802,927 | 4/1974 | Gomada | 148/4 |
| 3,850,698 | 11/1974 | Mallozzi et al. | 148/4 |
| 4,122,240 | 10/1978 | Banas et al. | 148/4 |

*Primary Examiner*—William E. Schulz
*Attorney, Agent, or Firm*—Thomas L. Sivak; Oscar B. Brumback

[57] ABSTRACT

An improved corrugator roll for use in an apparatus for making corrugated paperboard wherein the flute tip and a portion flank of the roll base metal are selectively hardened to a predetermined depth by an electro magnetic process. The valleys of the flutes and the remainder of the flank are maintained at the same hardness as the base material.

6 Claims, 1 Drawing Figure

CORRUGATOR ROLL

BACKGROUND OF THE INVENTION

1. Field of Invention

The invention relates to an improved corrugator roll for forming a web of corrugated paperboard and, more particularly, to an improved corrugator roll having a portion of the roll surface selectively hardened to a predetermined depth. A corrugator roll hardened in accordance with the teachings of the present invention demonstrated superior wear qualities while not being susceptible to cracking and chipping.

2. Description of the Prior Art

Corrugating rolls are used in machinery such as single-facer corrugators which are used in the manufacture of corrugated paperboard. A detailed description of a typical single-facer is given in Moser et al., U.S. Pat. No. 3,390,040. Since the typical single-facer machine is fully described therein, its structure and operation will not be further described herein, except where necessary to explain the present invention.

A typical corrugating roll in use today is 87 inches long, 12 inches in diameter and weighs approximately 2100 pounds. Certain prior art rolls are forged from alloyed steel and machined to the proper configuration. To use ordinary machining techniques, hardness of the base metal of the corrugator roll is limited to approximately 40 $R_C$. Certain other prior art rolls are rough machined using ordinary cutting tools and are then hardened by conventional heat treatment. The heat treatment distorts the machined roll, necessitating the use of grinders and the like to regain the desired dimensions. The additional grinding operation requires an additional expense in plant equipment and also involves an expense for the additional labor. These increased operations necessarily increase the cost of a hardened roll. In both types of prior art rolls the entire base metal of the roll is of uniform hardness.

In order to extend roll life, the entire surface of both types of rolls are generally chrome plated or coated with metallic oxide. While chrome plating and oxide coating do in fact extend the operational life of the roll, there are problems with their use. Metallic oxide coatings are expensive and it is difficult to get a good finish on this type of coating. Both chrome plated and oxide coated rolls are susceptible to cracking and chipping. Once they have cracked or chipped, the wear caused by the sliding of the paper web over the roll greatly increases. Since the cracking or chipping usually occurs at the flute tip, the point of maximum sliding friction, the flute tips wear much faster than the rest of the roll causing a loss of caliper. When the caliper of the roll is lost, the roll must either be replaced or reground.

The present invention overcomes the foregoing problems of the prior art by providing an improved corrugator roll which has superior wear characteristics while being economical to both manufacture and use.

SUMMARY OF THE INVENTION

The present invention provides an improved corrugator roll wherein the tip of the flute and the portion of the tip flank of the base metal are selectively hardened either by a laser beam or electron beam process. The tip of the flute and portion of the flank are hardened to a predetermined depth. The remainder of the tip flank and the valley between the flutes remain at the same hardness as the rest of the base metal. The present invention provides a new and improved corrugator roll which is a departure from past practices in the corrugating art by providing selective hardening of the base metal. The foregoing will more fully appear in the following detailed description when read in conjunction with the accompanying drawing.

DESCRIPTION OF THE PREFERRED EMBODIMENT

Figure 1:
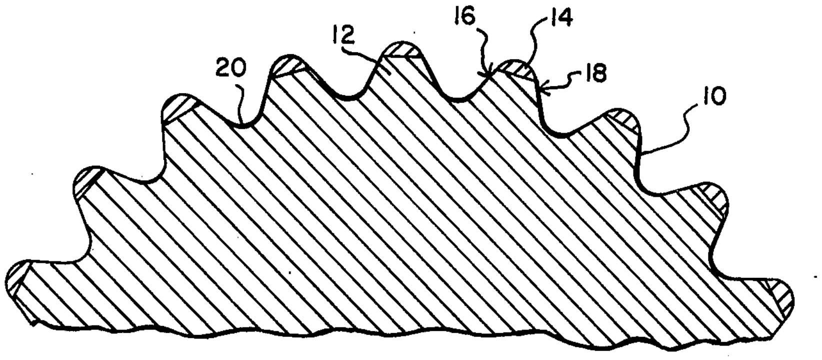
FIG. 1 is a side view in section of a corrugator roll selectively hardened in accordance with the present invention.

Referring to FIG. 1 which shows a section of a corrugating roll of the "C" type, the body of the roll 10 has flutes 12 having tips 14, tip flanks 16 and 18. The depressions between the flutes 12 are referred to as valleys 20. FIG. 1, which is not to scale, shows a roll of the "C" type which has 39 flutes per foot and each flute is 0.142 inch high. The take-up, 1.463, is the ratio of the medium to be corrugated to the liner which will be glued to the medium. The chordal pitch is 0.304 inch. In the typical "C" flute the tip has a radius of curvature of 0.0568 inch, the tip flank angle is 56°, and the valley has a radius of curvature of 0.0683 inch. The base metal of the roll is an alloy steel having a hardness of approximately 40 $R_C$.

In the preferred embodiment of the present invention the tip of the flute was hardened by a laser beam process to a depth of 0.031 inch. Hardening to this depth resulted in a portion of flanks 16 and 18 being hardened. Prior to use of the laser the roll surface 10 was cleaned and coated with flat black paint. The power for the hardening is 1150 watts at 21.25 kilovolts and 188 milliamperes. The transverse speed of the laser beam was 65 inches per minute. The focal length of the lens was 6 inches and argon gas was used to protect the lens. At the flute tip of the roll a beam of approximately 0.1 inch was obtained. The hardness achieved was 61 $R_C$. The remainder of the flute and the valleys were not hardened and kept at the same hardness as that of the base metal. The present invention is also equally applicable to corrugator rolls having different flute configurations. An example of such a configuration would be an "A" fluted roll having 33 flutes per foot, each flute being 0.1875 inch high.

The selective hardening of the flute tips and flanks provided by the present invention can also be achieved by an electron beam hardening process. The electron beam hardening process can be carried out in either a partial vacuum or in air. In a partial vacuum, 200 to 1000 torr, the accelerating voltage of the electron gun is 25,000 volts. The power of the beam is 7.5 kilowatts and beam diameter is 0.002 inch. The beam energy on the surface of the roll is twenty kilojoules. The beam is raster scanned over the surface to achieve the desired hardening profile.

In an alternate embodiment the tips 14 of the selectively hardened rolls 10 of the present invention can also be chrome plated or coated with a metallic oxide. The chrome plating can be placed by conventional methods to a depth of 0.002 to 0.003 inch. The chrome plating of the flute tip will increase its hardness to approximately 70 $R_C$.

While we have described certain preferred embodiments of our invention, it is understood it may otherwise be embodied within the scope of the following claims.

What is claimed:

1. An improved corrugator roll for use in machinery adapted to manufacture corrugated paperboard from a paper web, the improvement comprising:

the selective hardening of a predetermined portion of the flute tip and flute flank.

2. The improved corrugator roll of claim 1 wherein the preselected portions are hardened by means of a laser beam.

3. The improved corrugator roll of claim 1 wherein the preselected portions are hardened by means of an electron beam.

4. The improved corrugator roll of claim 2 wherein the depth of the hardening is 0.020 to 0.040 inch.

5. The improved corrugator roll of claim 3 wherein the depth of the hardening is 0.020 to 0.050 inch.

6. The improved corrugator roll of claim 1 wherein the hardened portion of the flute tip and flank is coated with a hard metal selected from the group consisting of chromium and metallic oxides.

* * * * *